United States Patent
Yu

(10) Patent No.: US 9,876,224 B2
(45) Date of Patent: *Jan. 23, 2018

(54) SILICON-EMBEDDED COPPER NANOSTRUCTURE NETWORK FOR HIGH ENERGY STORAGE

(71) Applicant: Amprius, Inc., Sunnyvale, CA (US)

(72) Inventor: Tianyue Yu, Sunnyvale, CA (US)

(73) Assignee: Amprius, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,388

(22) Filed: Mar. 11, 2016

(65) Prior Publication Data

US 2017/0025676 A1    Jan. 26, 2017

Related U.S. Application Data

(63) Continuation of application No. 14/255,418, filed on Apr. 17, 2014, now Pat. No. 9,287,560.

(Continued)

(51) Int. Cl.
*H01L 29/47*     (2006.01)
*H01M 4/36*      (2006.01)
(Continued)

(52) U.S. Cl.
CPC ........... *H01M 4/366* (2013.01); *H01M 4/134* (2013.01); *H01M 4/1395* (2013.01); *H01M 4/38* (2013.01);
(Continued)

(58) Field of Classification Search
CPC combination set(s) only.
See application file for complete search history.

(56) References Cited

U.S. PATENT DOCUMENTS 7,816,031 B2 * 10/2010 Cui .................... H01M 4/0421
                                                                429/209
9,287,560 B2 *  3/2016 Yu ..................... H01M 4/1395
(Continued)

OTHER PUBLICATIONS

Office Action dated Mar. 27, 2015 issued in U.S. Appl. No. 14/255,418.
(Continued)

*Primary Examiner* — Tram H Nguyen
(74) *Attorney, Agent, or Firm* — Weaver Austin Villeneuve & Sampson LLP

(57) ABSTRACT

Provided herein are nanostructure networks having high energy storage, electrochemically active electrode materials including nanostructure networks having high energy storage, as well as electrodes and batteries including the nanostructure networks having high energy storage. According to various implementations, the nanostructure networks have high energy density as well as long cycle life. In some implementations, the nanostructure networks include a conductive network embedded with electrochemically active material. In some implementations, silicon is used as the electrochemically active material. The conductive network may be a metal network such as a copper nanostructure network. Methods of manufacturing the nanostructure networks and electrodes are provided. In some implementations, metal nanostructures can be synthesized in a solution that contains silicon powder to make a composite network structure that contains both. The metal nanostructure growth can nucleate in solution and on silicon nanostructure surfaces.

16 Claims, 14 Drawing Sheets

Related U.S. Application Data

(60) Provisional application No. 61/813,175, filed on Apr. 17, 2013.

(51) Int. Cl.

| | | |
|---|---|---|
| *H01M 4/38* | (2006.01) | |
| *H01M 4/134* | (2010.01) | |
| *H01M 4/1395* | (2010.01) | |
| *H01M 4/48* | (2010.01) | |
| *H01M 10/0525* | (2010.01) | |
| *H01M 4/02* | (2006.01) | |
| *H01M 4/62* | (2006.01) | |
| *H01M 10/052* | (2010.01) | |
| *B82Y 30/00* | (2011.01) | |

(52) U.S. Cl.
CPC ........... *H01M 4/386* (2013.01); *H01M 4/387* (2013.01); *H01M 4/483* (2013.01); *H01M 4/626* (2013.01); *H01M 10/0525* (2013.01); *B82Y 30/00* (2013.01); *H01M 4/622* (2013.01); *H01M 4/624* (2013.01); *H01M 10/052* (2013.01); *H01M 2004/021* (2013.01)

(56) References Cited

U.S. PATENT DOCUMENTS

| | | | |
|---|---|---|---|
| 2008/0230763 A1* | 9/2008 | Zaidi | B22F 1/0018 257/9 |
| 2010/0255252 A1* | 10/2010 | Kim | H01J 1/304 428/141 |
| 2010/0283031 A1* | 11/2010 | Kim | G01N 33/5432 257/9 |
| 2011/0050042 A1* | 3/2011 | Choi | H01L 41/37 310/339 |
| 2011/0111300 A1* | 5/2011 | Delhagen | H01M 4/13 429/223 |
| 2011/0111304 A1* | 5/2011 | Cui | H01M 4/0421 429/231.8 |
| 2011/0171502 A1* | 7/2011 | Kottenstette | H01M 4/131 429/49 |
| 2014/0342192 A1* | 11/2014 | Wang | H01M 4/505 429/7 |

OTHER PUBLICATIONS

Notice of Allowance dated Oct. 23, 2015, issued in U.S. Appl. No. 14/255,418.

* cited by examiner

SILICON-EMBEDDED COPPER NANOSTRUCTURE NETWORK FOR HIGH ENERGY STORAGE

CROSS-REFERENCE TO RELATED APPLICATIONS

This application is a continuation of and claims priority to U.S. application Ser. No. 14/255,418, titled "SILICON-EMBEDDED COPPER NANOSTRUCTURE NETWORK FOR HIGH ENERGY STORAGE," filed Apr. 17, 2014, which claims the benefit of priority under 35 USC § 119(e) to U.S. Provisional Patent Application No. 61/813,175, titled "SILICON-EMBEDDED COPPER NANOSTRUCTURE NETWORK FOR HIGH ENERGY STORAGE," filed Apr. 17, 2013, each of which is incorporated herein by reference in its entirety and for all purposes.

STATEMENT OF GOVERNMENT SUPPORT

The invention described and claimed herein was made in part utilizing funds supplied by the U.S. Department of Energy under Contract No. DE-EE0005474. The Government has certain rights in this invention.

FIELD OF THE INVENTION

This invention relates generally to electrodes for lithium ion batteries.

BACKGROUND OF THE INVENTION

There is a continuous challenge to design lithium batteries with higher and higher energy densities. Silicon, alone or in combination with other materials such as germanium, tin, antimony and aluminum, has been widely studied as an anode material for lithium batteries. Currently-used graphite anodes have a much lower lithium storage capacity than do silicon anodes. However, silicon expands as much as 400% upon lithiation, which causes problems such as cracking, making it difficult for silicon to endure much cycling. It remains a challenge to exploit the theoretical lithium capacity of silicon in a lithium battery anode.

DETAILED DESCRIPTION

Figure 1A:
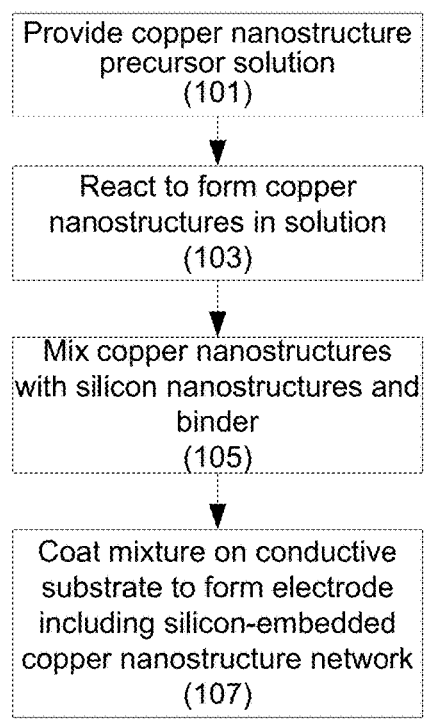
FIGS. 1A-3B examples of manufacturing processes that may be used to form electrodes including nanostructure networks including electrochemically active and conductive materials, according to various implementations.

According to various implementations, provided herein are nanostructure networks having high energy storage, electrochemically active electrode materials including nanostructure networks having high energy storage, as well as electrodes and batteries including the nanostructure networks having high energy storage. Methods of manufacturing the nanostructure networks and electrodes are provided. According to various implementations, the nanostructure networks have high energy density as well as long cycle life.

The nanostructure networks include an electrochemically active material with examples including, but not limited to, silicon, silicon oxide, silicides, germanium, and tin. In some embodiments, the electrochemically active material is a high capacity active material. A "high capacity active material," as used in this document refers to a material having a theoretical lithiation capacity of at least about 500 mAh/g. In certain implementations, the electrochemically active material may have a theoretical lithiation capacity of at least about 600 mAh/g or at least about 1000 mAh/g. The nanostructure networks include an electronically conductive material with examples including, but not limited to copper, silver, gold, palladium, nickel, and platinum.

In some implementations, the electronically conductive material forms a conductive network that provides an electronically conductive pathway to and from the electrochemically active material even if there is delamination of the electrochemically active material from a conductive substrate or other active material due to lithiation-induced swelling of the active material. This can prevent portions of an active layer of an electrode from becoming disconnected and dead, improving energy density and cycle life.

In some implementations, a nanostructure network includes a plurality of nanostructures of a first type and a plurality of nanostructures of a second type combined to form the network. According to various implementations, the nanostructures of the first type include an electrochemically active material, with the nanostructures of the second type including an electronically conductive material. According to various embodiments, the nanostructures of the first type may consist essentially of high capacity materials, or have a sufficient quantity of a high capacity active material such that the nanostructures of the first type have a theoretical lithiation capacity at least about 500 mAh/g or higher as described above.

In some implementations, at least a portion of the nanostructures of the second type are growth-rooted on nanostructures of the first type. In some implementations, the nanostructures of the second type are blended post-synthesis with the nanostructures of the first type to form the nanostructure network. According to various implementations, nanostructures of electrochemically active material may be embedded into nanostructures of electronically conductive material during or after synthesis of the latter.

In some implementations, the nanostructure networks include silicon (Si) as the electrochemically active material and copper (Cu) as the conductive material. FIGS. 1A-3B provide examples of manufacturing processes that may be used to form electrodes including such nanostructure networks. While the description below refers chiefly to Cu/Si networks, it will be understood that other active materials may be used in addition to or instead of silicon and/or other conductive materials may be used in addition to or instead of copper.

FIG. 1A shows an example of a process for forming an electrode including a silicon-embedded copper nanostructure network in which silicon nanostructures are mixed with copper nanostructures post-copper nanostructure synthesis. First, a copper nanostructure precursor solution is provided. Block 101. Copper nanostructures of various morphologies may be prepared from reduction of copper salts in solution. Examples of copper precursors include copper nitrate (Cu(NO$_3$)$_2$), copper sulfate (CuSO$_4$), copper chloride (CuCl$_2$), and hydrates thereof. Examples of solvents include water (H$_2$O), de-ionized water, ethylene glycol (C$_2$H$_6$O$_2$), di-ethylene glycol (C$_4$H$_{10}$O$_3$), and toluene (C$_7$H$_8$). Examples of reducing agents include hydrazine (N$_2$H$_4$), sodium borohydride (NaBH$_4$), ascorbic acid (C$_6$H$_8$O$_6$), isopropyl alcohol (C$_3$H$_8$O), polyols, amines, and glucose (C$_6$H$_{12}$O$_6$) and other sugars. A capping agent/stabilizer may be used with examples including polyvinylpyrrodlidone (PVP), polyethylene glycol (PEG), sodium dodecyl sulfate (SDS), cetyltrimethylammonium bromide (CTAB), and hexadecylamine (HDA).

Copper nanowires may be formed, for example, by reduction of copper nitrate with hydrazine in an aqueous solution containing sodium hydroxide and ethylenediamine (EDA). See Rathmall et al., Adv. Mater. 2010, Volume 22, Issue 32, pages 3558-3563, incorporated by reference herein. In another example ultra-long copper nanowires having controllable diameters of 30-100 nm can be formed by reduction of copper chloride aqueous solution using octadecylamine (ODA). See Shi et al., Science and Technology of Advanced Materials 6 (2005) 761-765, incorporated by reference herein. Copper nanoparticles of various morphologies, including cubes, pyramids, pentagons, etc. can be formed by reduction of copper chloride hydrate (CuCl$_2$.H$_2$O) by glucose with HDA used as a capping agent. See Jin et al., Angew. Chem. Int. Ed. 2011, 50, 10560-10564, incorporated by reference herein.

Next, a reaction is run to form the copper nanostructures in solution. Block 103. Block 103 generally involves heating the solution depending on the reaction system. The solution may turn from a blue to a reddish brown color indicative of copper (II) reduction and formation of the copper nanostructures. Once synthesized, the copper nanostructures can be blended with silicon nanostructures to form a silicon-embedded copper nanostructure network. The silicon nanostructures may be in the form of a powder in certain implementations and can be any one or more of nanowires, nanospheres, nanotubes, nanosheets, nanoflakes, micron-scale powder, nanospheres, and other morphologies. The silicon nanostructures may be solid, porous, or hollow according to various implementations.

According to various implementations, the copper nanostructures and silicon nanostructures may be blended in any appropriate medium. In the example of FIG. 1A, the copper nanostructures and silicon nanostructures are mixed with a binder. Block 105. Binders may be soluble in aqueous or non-aqueous solvents, which are used during fabrication. Examples of non-aqueous binders include poly(tetrafluoroethylene) (PTFE), poly(vinylidene fluoride) (PVDF), styrene-butadiene copolymer (SBR), acrylonitrile-butadiene copolymer (NBR), polyacrylic, and polyethylene oxide, and combinations thereof. Examples of aqueous binders include carboxymethyl cellulose and poly(acrylic acid), acrylonitrile-butadiene copolymer latex, and polyacrylamide in combination with carboxylated styrene-butadiene copolymer and/or styrene-acrylate copolymer. In certain implementations, the binder may include a fluoropolymer and a metal chelate compound. The fluoropolymer may be polymerized from fluorinated monomers, such as vinyl fluoride (VF), vinylidene fluoride (VdF), tetrafluoroethylene (TEE), trifluoroethylene (TrFE), chlorotrifluoroethylene (CTFE), fluorinated vinyl ethers, fluorinated alkyl acrylates/methacrylates, perfluoro C$_3$-C$_{10}$ perfluoroolefins, perfluoro C$_1$-C$_8$ alkyl ethylenes and fluorinated dioxoles. In some implementations, a conductive binder may be used. Examples of conductive binders include polyaniline (PANI), polypyrrole (PPY), and poly(3,4-ethylenedioxythiophene) (PEDOT).

The mixture may be coated on a conductive substrate in a slurry-based process. Block 107. Substrate materials for electrodes used in various lithium ion cells may include copper and/or copper dendrite coated metal oxides, stainless steel, titanium, aluminum, nickel (also used as a diffusion barrier), chromium, tungsten, metal nitrides, metal carbides, carbon, carbon fiber, graphite, graphene, carbon mesh, conductive polymers, or combinations of the above including multi-layer structures. The substrate material may be formed as a foil, film, mesh, laminate, wires, tubes, particles, multi-layer structure, or any other suitable configuration. Examples of substrates include a copper or stainless steel foil having thickness of between about 1 micrometer and 50 micrometers.

Figure 1B:
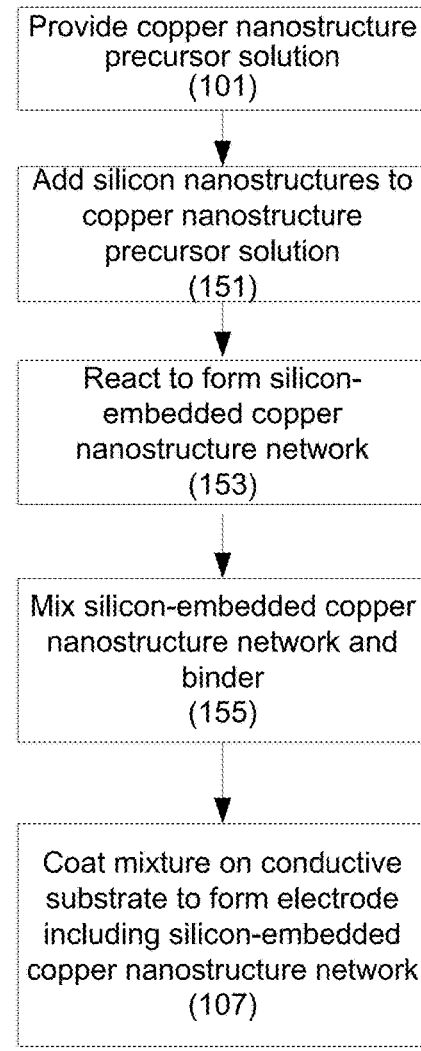

FIG. 1B shows an example of a process for forming an electrode including a silicon-embedded copper nanostructure network in which silicon nanostructures are mixed with copper nanostructures during synthesis of the latter. As in the example of FIG. 1A, the process begins by providing a copper nanostructure precursor solution. Block 101. Silicon nanostructures are added to the copper nanostructure precursor solution. Block 151. The silicon nanostructures may be added in the form of a powder in certain implementations and can be any one or more of nanowires, nanospheres, nanotubes, nanosheets, nanoflakes, micron-scale powder, nanospheres, and other morphologies. The silicon nanostructures may be solid, porous, or hollow according to various implementations.

Next, a reaction is run to form the silicon-embedded copper nanostructure network. Block 153. Like block 103 in FIG. 1A, block 153 generally involves heating the solution depending on the reaction system. In the example of FIG. 1B, at least some of the copper nanostructures nucleate on silicon nanostructures and are thereby growth-rooted to the silicon nanostructures. The ends or other portions of the copper nanostructures that grow from the silicon nanostructures form an integral structure with the silicon nanostructures and may not have a clearly defined morphological boundary or interface with the silicon nanostructures to which they are attached. Some of the copper nanostructures may nucleate in solution, not on a silicon nanostructure.

According to various implementations, the reaction conditions in block 153 may generally be the same as in block 103 of FIG. 1A. In some cases, the presence of silicon nanostructures has shown to induce a faster color change, indicative of Cu(II) reduction. In some implementations, the silicon nanostructures may be functionalized prior to block 151 to facilitate copper nucleation and growth rooting on the silicon nanostructures. For example, the surface of the silicon nanostructures may be activated by forming silane (Si—H) bonds to facilitate copper nucleation. Such silane-activated silicon nanostructures are generally incompatible with aqueous solutions, however anhydrous solutions may be used in block 101.

Once the silicon-embedded copper nanostructure network is formed, it may be mixed with a binder. Block 155. Examples of binders are described above with reference to FIG. 1A. The mixture may be coated on a conductive substrate in a slurry-based process in block 107 also as described above in the example of FIG. 1A.

Figure 2A:
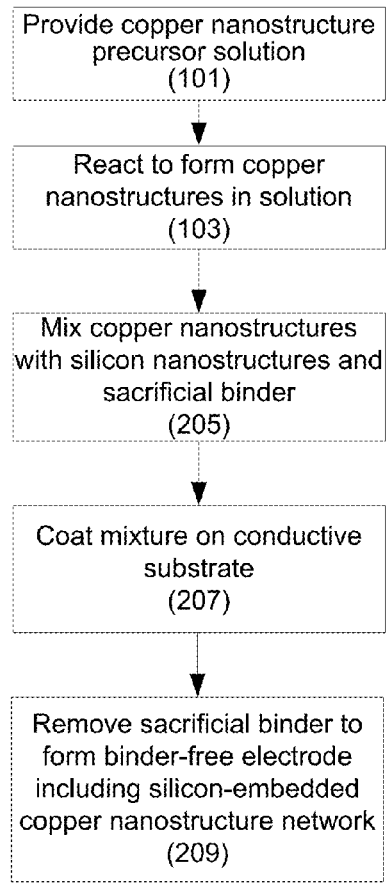
Figure 2B:
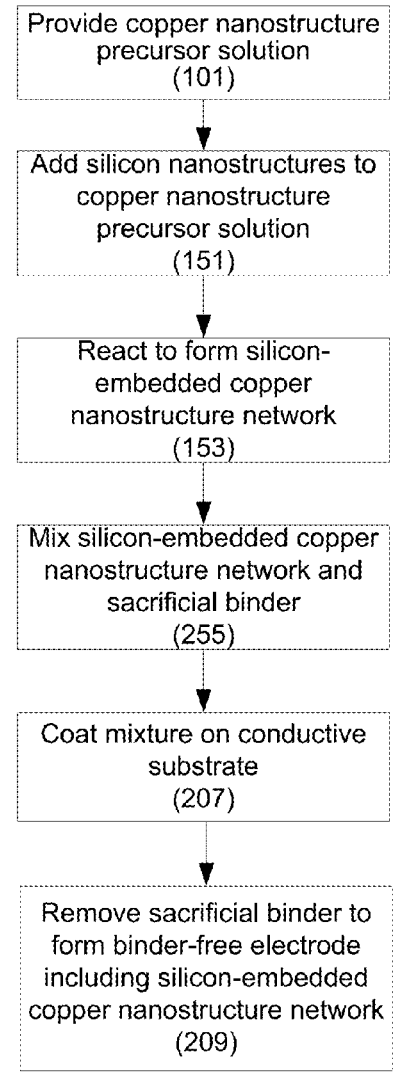

Further examples of processes for fabricating electrodes including silicon-embedded copper nanostructure networks are given below. FIGS. 2A and 2B provide examples fabricating binder-free electrodes, using a sacrificial binder to facilitate coating the network on a conductive substrate. First turning to FIG. 2A, blocks 101 and 103 may be performed as described above with respect to FIG. 1A. The copper nanostructures formed in block 103 are then mixed with silicon nanostructures as described above with respect to FIG. 1A and a sacrificial binder. Block 205. The sacrificial binder is a material that is removable, for example, by decomposition or sublimation on exposure to one or more of heat or vacuum. Examples include poly(methyl methacrylate) (PMMA), polyethylene carbonate, and camphor. The mixture is then coated on a conductive substrate. Block 207. The sacrificial binder is then removed to form a binder-free electrode including a silicon-embedded copper nanostructure network. Block 209. Block 209 can involve subjecting the mixture to heat and/or vacuum to decompose or sublimate the sacrificial binder. For example, PMMA is removable at 100° C.-250° C. by decomposition, polyethylene carbonate is removable by decomposition at 200° C.-300° C., and camphor sublimates at 170° C.-200° C. Any appropriate removable method may be used in block 209; for example, in some implementations, the sacrificial binder may be removable by a selective chemical etch, depending on the composition of the binder. In processes that involve sintering such as discussed below with respect to FIGS. 3A and 3B, the sintering temperature may be high enough to remove all organic materials.

FIG. 2B shows another example of a process for forming an electrode including a silicon-embedded copper nanostructure network. The process of FIG. 2B is similar to that of FIG. 2A, with the copper nanostructures synthesized in the presence of silicon nanostructures. Blocks 101, 151, and 153 may be performed as disclosed above with respect to FIG. 1B to form a silicon-embedded copper nanostructure network. The silicon-embedded copper nanostructure network is then mixed with a sacrificial binder. Block 255. Examples of sacrificial binders are given above with reference to block 205 of FIG. 2A. Blocks 207 and 209 may then be performed as described above with respect to FIG. 2A.

Figure 3A:
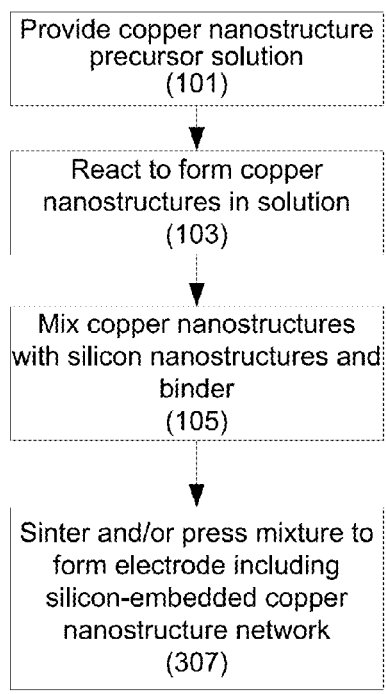
Figure 3B:
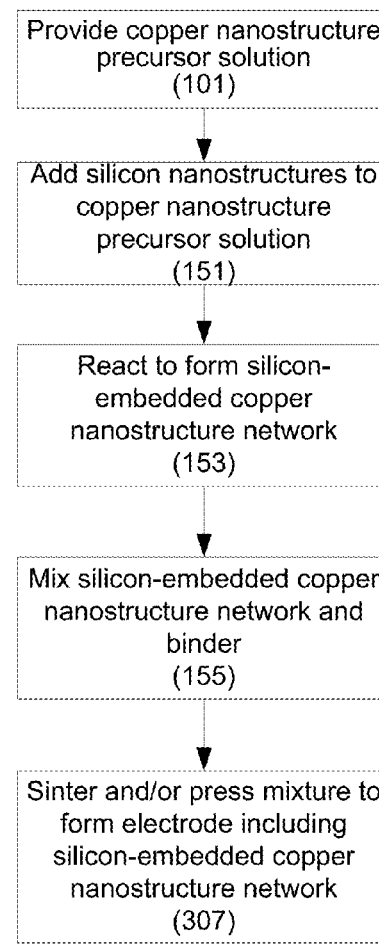

In some implementations, the nanostructure networks are electronically conductive enough that they function as electrodes without conductive substrates. FIGS. 3A and 3B provide examples of processes for fabricating electrodes without coating a conductive substrate. Sintering and pressing is used in FIGS. 3A and 3B to form the silicon-embedded copper nanostructure containing layer without slurry coating. In FIG. 3A, the process begins by performing blocks 101, 103, and 105 as discussed above with reference to FIG. 1A to form a mixture of a binder, copper nanostructures and silicon nanostructures. At block 307, the mixture is sintered and/or pressed to form an electrode including a silicon-embedded copper nanostructure network. The process of FIG. 3B is similar to that of FIG. 3A, with the copper nanostructures synthesized in the presence of silicon nanostructures. Blocks 101, 151, 153, and 155 may be performed as disclosed above with respect to FIG. 1B. Block 307 may then be performed as in the example of FIG. 3A. The processes in the examples of FIGS. 3A and 3B can be used to make active layers and electrodes of various form factors, such as disks, plates, etc. Sintering typically removes all organic material, increasing percentage active material in loading. Depending on the system, sintering temperatures may be high, e.g., 400° C.-1000° C.

As discussed further below, sintering and/or pressing the network structure may improve electrical conductivity at metal-metal (M-M) and metal-silicon (M-Si) contact points, and with a conductive substrate (if used). In one arrangement, sintering conditions (e.g., time, temperature, and atmosphere) are chosen so that essentially no silicide forms at the M-Si interface. In another arrangement, it can be useful to adjust the sintering conditions so that thin layers of silicide form at M-Si contact points to ensure good ohmic contact. In some implementations, the network structure is pressed before sintering to increase the number of metal nanostructures that are in contact with Si nanowires and to ensure good electrical conductivity.

While the examples of FIGS. 1A, 2A, and 3A show mixing the copper nanostructures and silicon nanostructures in a binder material, the copper nanostructures and silicon nanostructures may be mixed in any appropriate medium. This may be done prior to adding the silicon-embedded copper nanostructure network to a binder, etc. For example, silicon nanostructures and copper nanostructures may be mixed in isopropyl alcohol (IPA) to form a silicon-embedded copper nanostructure network. In other examples, the active material-embedded copper nanostructures may be formed by deposition of an active material or active material precursor on a copper nanostructure network. Deposition methods include chemical vapor deposition and electrodeposition. Further, methods other than slurry-coating may be used to form electrodes, including drop-casting, extrusion, and spray-coating.

Figure 4:
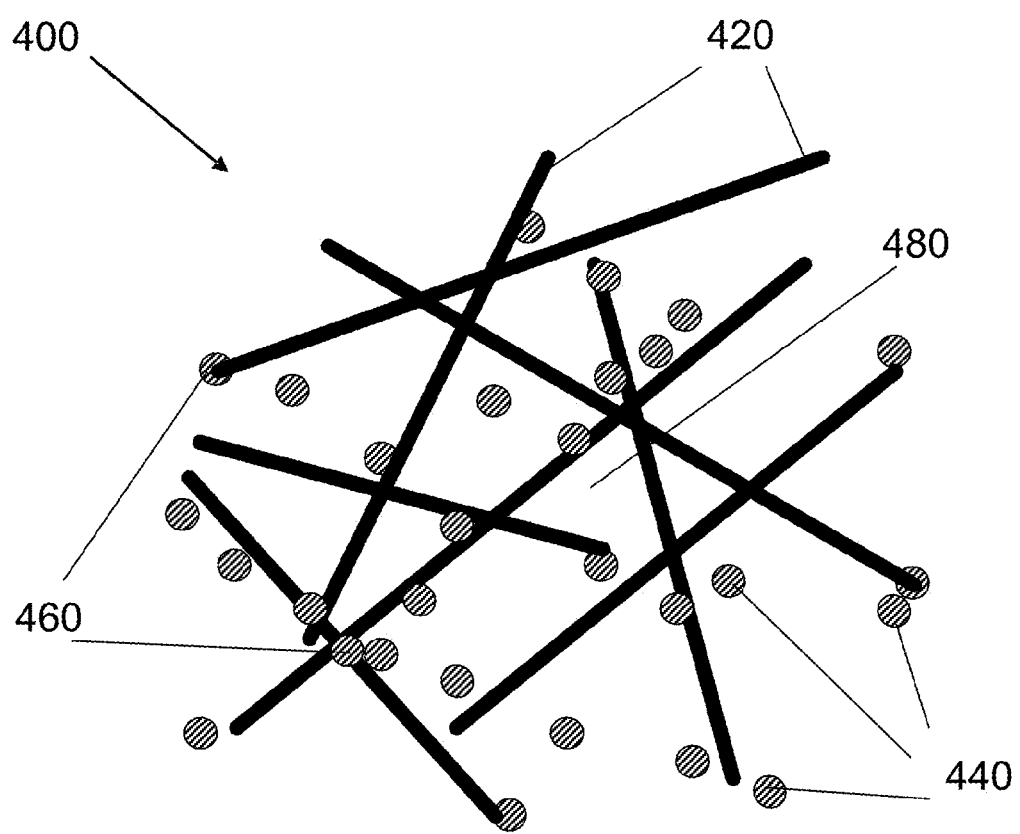
FIG. 4 is a schematic illustration of an example of a network structure of silicon nanowires and copper nanoparticles, according to certain implementations.
Figure 5:
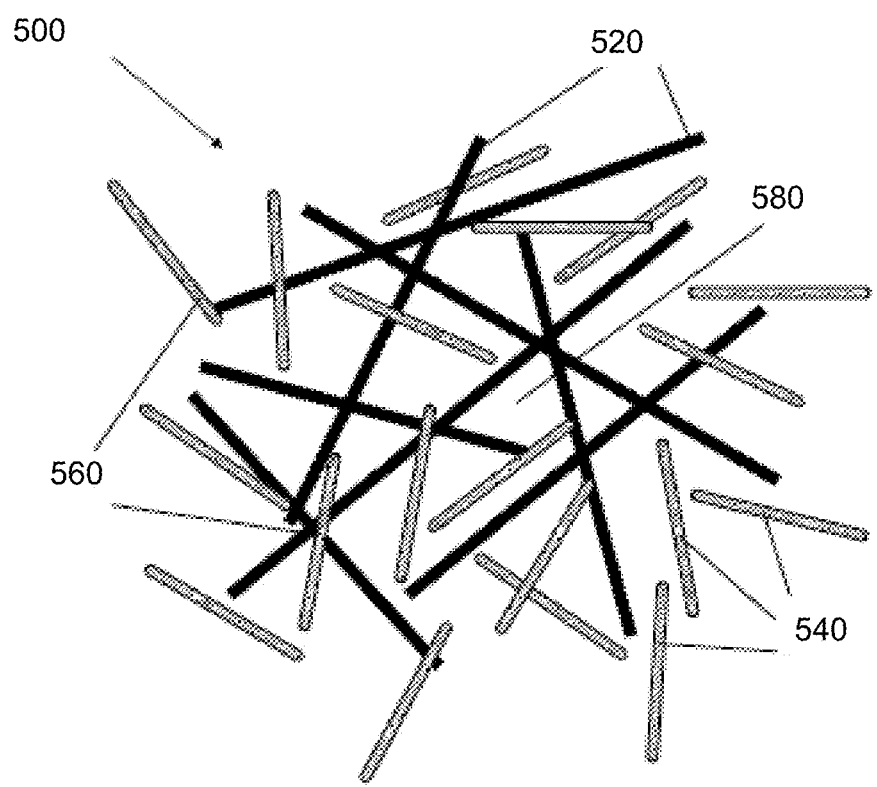
FIG. 5 is a schematic illustration of an example of a network structure of silicon nanowires and copper nanorods, according to certain implementations.

The silicon-embedded copper nanostructure networks formed in the examples of FIGS. 1A-3B are porous, with open space between the copper and silicon nanostructures. The nanostructures are interconnected to form a network. FIGS. 4 and 5 provide schematic examples of network structures of silicon nanowires and copper nanostructures that may be formed, for example, by blocks 101, 151, and 153 in the examples of FIGS. 1B, 2B, and 3B. In FIG. 4, a network structure 400 includes silicon nanowires 420 and copper nanoparticles 440. Some of the copper nanoparticles 440 have been nucleated on a silicon nanowire 420 as in the methods described above and are growth-rooted to a silicon nanowire 420. Some of the copper nanoparticles 440 have nucleated in solution and are not growth-rooted. Examples of growth-rooted copper nanoparticles are show as 460. The silicon nanowires 420 and the nanoparticles 440 are not packed very closely together, but rather form a porous structure with much open space 480 between them. In FIG. 5, an example of a network structure of silicon nanowires and copper nanorods is shown. The network structure 500 includes silicon nanowires 520 and copper nanorods 540. Some of the copper nanorods 540 have nucleated on silicon nanowires 520 as in the methods described above and are growth-rooted to a silicon nanowire 520. Some of the copper nanoparticles 540 have nucleated in solution and are not growth-rooted. Examples of growth-rooted copper nanorods are show as 560. The nanowires 520 and the nanorods 540 are not packed closely together, but rather form a porous structure with much open space 580 between them. Porosity can be such that between about 20% and 80% of the volume of the active layer is open space.

In the above examples, the silicon nanostructures are the active material of the electrode, with the copper nanostructures providing electronically conductive paths to and from the silicon nanostructures. According to various implementations, the copper nanostructures provide electronically conductive paths to and from the silicon nanostructures by one or more of: physically contacting the silicon nanostructures, being growth rooted to the silicon nanostructures, and being sintered fused to the silicon nanostructures. Still further, in some implementations, a conductive coating on the silicon nanostructures may increase conductivity of the network.

In some implementations in which silicon nanostructures are mixed with copper nanostructures post-synthesis, the silicon nanostructures mix readily with the copper nanostructures, forming a silicon-embedded copper nanostructure network, with the silicon nanostructures directly contacting other silicon nanostructures and/or copper nanostructures and with the copper nanostructures directly contacting silicon nanostructures and/or other copper nanostructures. The ratio of silicon to copper may be adjusted to produce a desired network structure.

As described above, in some implementations, at least a portion of the copper nanostructures nucleate on one or more silicon nanostructures and are growth-rooted to the silicon nanostructures. In addition, copper nanostructures in such a network may also be in non-growth rooted contact with various silicon nanostructures with or without also being growth-rooted.

While the above description refers chiefly to Cu/Si networks, it will be understood that other active materials may be used in addition to or instead of silicon and/or other conductive materials may be used in addition to or instead of copper.

Examples of electrochemically active materials include silicon containing materials (e.g., crystalline silicon, amorphous silicon, other silicides, silicon oxides, sub-oxides, oxy-nitrides), tin containing materials (e.g., tin, tin oxide), germanium, carbon containing materials, a variety of metal hydrides (e.g., $MgH_2$), silicides, phosphides, and nitrides. Other examples include: carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon). Nanostructures of any of these active materials may be used. The conductive networks embedded with active material disclosed herein may be particularly advantageous with high capacity active materials that undergo significant volume change between charge and discharge.

In many implementations, the conductive materials are metals that are highly conductive. Nanostructures of copper, silver, gold, palladium, nickel, and platinum, and alloys thereof may be used. For example, CuNi nanowires may be synthesized by mixing a copper precursor solution with $Ni(NO_3)_2.6H_2O$. See Rathmell et al. Nano Lett. 2012 Jun. 13; 12(6):3193-9, incorporated by reference herein.

The processes disclosed in FIGS. 1A-3B may be modified according to the active material and conductive material used. Further in implementations, such as those disclosed in FIGS. 1A, 2A, and 3A, in which the conductive material is blended with the active material post-synthesis, conductive carbon materials may be used, such as conductive carbon nanotubes and graphene to form the conductive network.

According to various implementations, the nanostructures disclosed herein may be structures that have at least one sub-micron dimension. That is, the smallest of the length, width, height, diameter or other appropriate dimension of a nanostructure may be sub-micron. In some implementations, two or more dimensions, or all of the dimensions of the nanostructure disclosed herein may be sub-micron. In some implementations, the nanostructures disclosed herein may be structures that have at least one sub-500 nm dimension, at least one sub-100 nm dimension, or at least one sub-50 nm dimension. As described further below, in some implementations, the active material nanostructure may be larger, for example, having a diameter of 1500 nm (1.5 microns).

Figure 6:
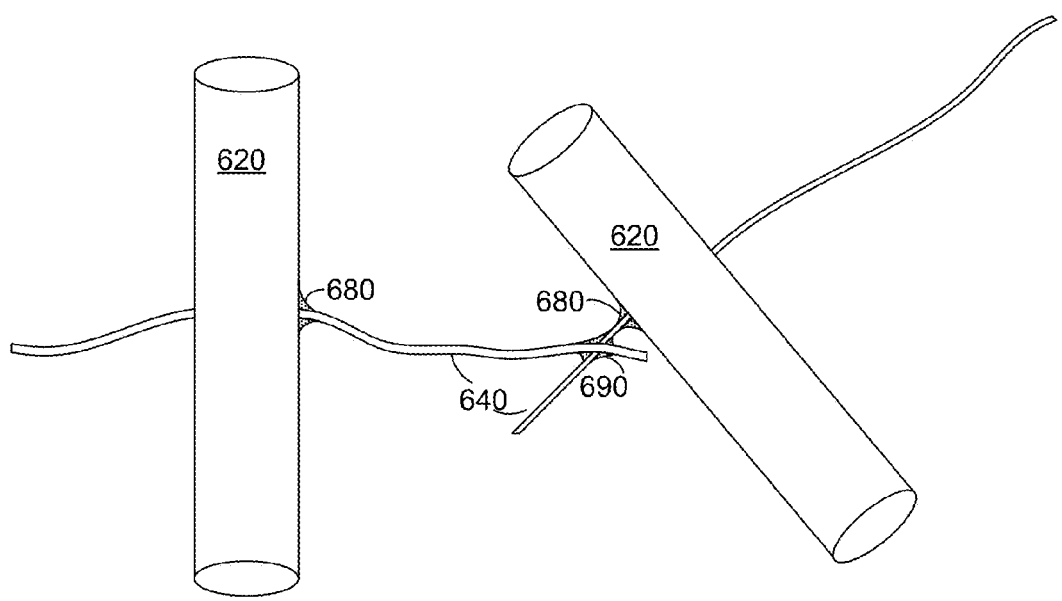
FIG. 6 is a schematic illustration of an example of a network structure of active material nanowires and metal nanowires, according to certain implementations.

In certain implementations, the silicon-embedded copper nanostructure network may be heated to fuse or otherwise increase a mechanical connection between the silicon and copper nanostructures in various places in the network. Such heating may take place during or after synthesis of the copper nanostructures, during or after mixing with a binder or other suitable mixing medium, or during or after coating on a conductive substrate. In some implementations, necking between the silicon nanostructures and copper nanostructures may be observed at various points in the network due to heating. FIG. 6 shows an example of a portion of a network including active material (e.g., Si) nanowires 620 and metal (e.g., Cu) nanowires 640 that contact the active material nanowires 620. Necks 680 between the active material nanowires 620 and metal nanowires 640 at the point of contact increase the mechanical and electrical connection between the active material nanowires and metal nanowires. Temperatures at which the silicon-embedded copper nanostructures may be thermally treated can range, e.g., from 70° C. to well over 400° C., with the low end of the range being a representative copper nanostructure synthesis temperature and the high end of the range being a sintering temperature. Heating may also be used to increase metal-metal connections of the conductive network. In FIG. 6, metal-metal necks 690 are shown.

In some implementations, the silicon nanostructures (or other active material nanosturctures) are larger than the copper nanostructures (or other conductive nanostructures), as measured by the smallest the dimension of each nanostructure. For example, in implementations that employ silicon nanowires and copper nanowires, the copper nanowires may be thinner than the silicon nanowires. In some arrangements, the copper nanowire (or other conductive nanostructure) diameters are less than 100 nm, or between about 20 nm and 80 nm, or between about 20 nm and 60 nm. In some arrangements, the silicon nanowires (or other active material nanostructure) have diameters that average between about 200 nm and 1500 nm, or between about 800 nm and about 1200 nm, or between about 900 nm and 1100 nm. According to various embodiments, the active material nanostructures may be at least twice as large as the conductive material nanostructures, or even at least an order of magnitude larger than the conductive material nanostructures. The active material nanostructures may be at least two orders of magnitude larger than the conductive material nanostructures. (In characterizing relative nanostructure sizes, a mean, average, median or other appropriate value of each type of nanostructure may be used.). Copper nanowires, for example, may be characterized as thin, hair-like structures wrapped around the larger silicon nanostructures. The large silicon nanostructures can permit the electrodes to have high energy density. In some implementations, long metal nanowires may be used. For example, metal nanowires may have lengths of 1-50 microns. This can permit the formation of networks having a high number of interconnections with the active material and other conductive nanostructures. It should be noted that in some implementations in which the active material nanostructures are larger than the conductive nanostructures, the conductive:active material atomic ratio (e.g, Metal:Si or Cu:Si ratio) in the active layer may be higher, with more copper nanostructures present for conductivity. For example, a molar ratio of Cu:Si may range from 1:10-10:1, with further examples being 1:5-5:1 or 1:1.5-1.5:1. In general, it is desirable to have as high active material (e.g., Si) content as possible to achieve higher anode energy density, while maintaining sufficient conductivity.

In some implementations, a porous, binder-free active layer is provided. Such a layer may be formed, e.g., as disclosed above with reference to FIGS. 2A-3B, or by depositing silicon on a copper nanostructure network that may be formed, e.g., as discussed above with respect to blocks 101 and 103 of FIG. 1A. Deposition may occur prior to or after the copper nanostructure network is attached to a conductive substrate by slurry coating, drop casting, or other appropriate method. Further, in some implementations, a porous, binder-free active layer including a copper nanostructure network having silicon deposited thereon may be included in anode without a conductive substrate. Porosity may be controlled by controlling the amount of copper and/or silicon as well as other factors.

The desired porosity depends on the lithiation depth and relative loading of the active material. For example, for a Si/binder/carbon black system, for example, assuming 100% Si mass loading, if Si is lithiated to 1000 mAh/g, 50% porosity will accommodate Si volume expansion. If Si is lithiated to 2000 mAh/g, 67% porosity will accommodate the volume expansion. (These porosity estimates assume that Si volume doubles at 1000 mAh/g and triples at 2000 mAh/g.) For systems for which the mass loading is not 100%, at any given lithiation depth, the higher the Si percentage is, the higher porosity to accommodate volume expansion. For example, at 1000 mAh/g lithiation depth, porosity requirement increases from 39% to 43% when Si % increases from 70% to 80%; and at 2000 mAh/g lithiation depth, porosity requirement increases from 56% to 60% when Si % increases from 70% to 80%. A Si/Cu or Si/binder/Cu system will follow the same trend (with the exact numbers differing from the Si/binder/carbon black system). As a Cu:Si ratio decreases, the porosity to accommodate volume expansion will approach 50% at 1000 mAh/g and 67% at 2000 mAh/g Si lithiation levels. Of course, prior to Cu reaching 0%, the conductive network would lose its effectiveness.

Figure 7:
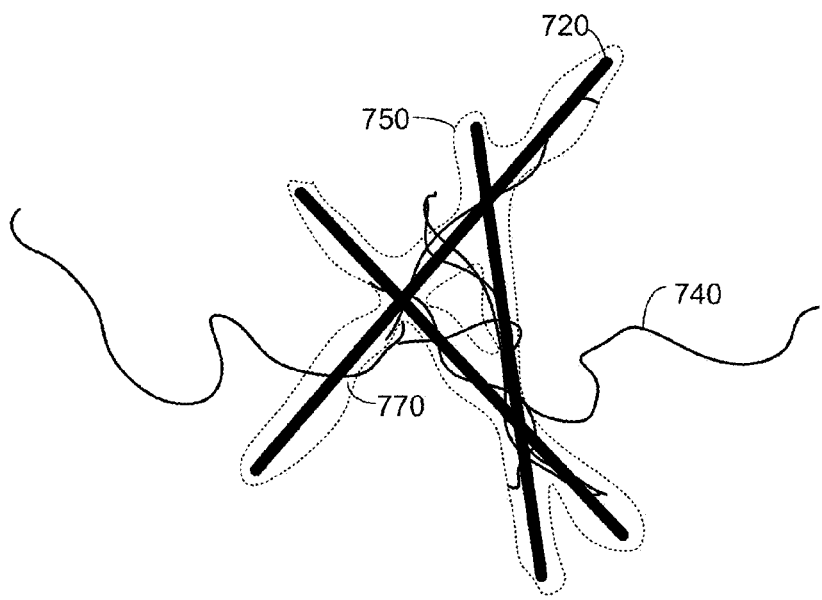
FIG. 7 is a schematic illustration of an example of a portion of an active layer including a silicon embedded copper nanostructure network with a conductive surface coating, according to certain implementations.

The nanostructure networks described herein provide a long-range conductive network embedded with active material. In some implementations, the nanostructure networks may be further coated with a conductive binder or other conductive surface coating. Examples of such conductive coatings include polyaniline (PANI), polypyrrole (PPY), and poly(3,4-ethylenedioxythiophene) (PEDOT). A schematic example of a portion of an active layer including a silicon embedded copper nanostructure network with a conductive surface coating is provided in FIG. 7. In FIG. 7, a network includes silicon nanowires 720, copper nanowires 740, and a conductive polymer 750. Depending on the deposition conditions, the thickness of the copper nanowires, and the conductive polymer, the conductive polymer may or may not substantially coat the copper nanowires 740. However, the conductive polymer 750 wraps around the copper nanowire/silicon nanowire intersections, such as intersection 770. This can increase the overall network conductivity.

Example 1

Figure 8:
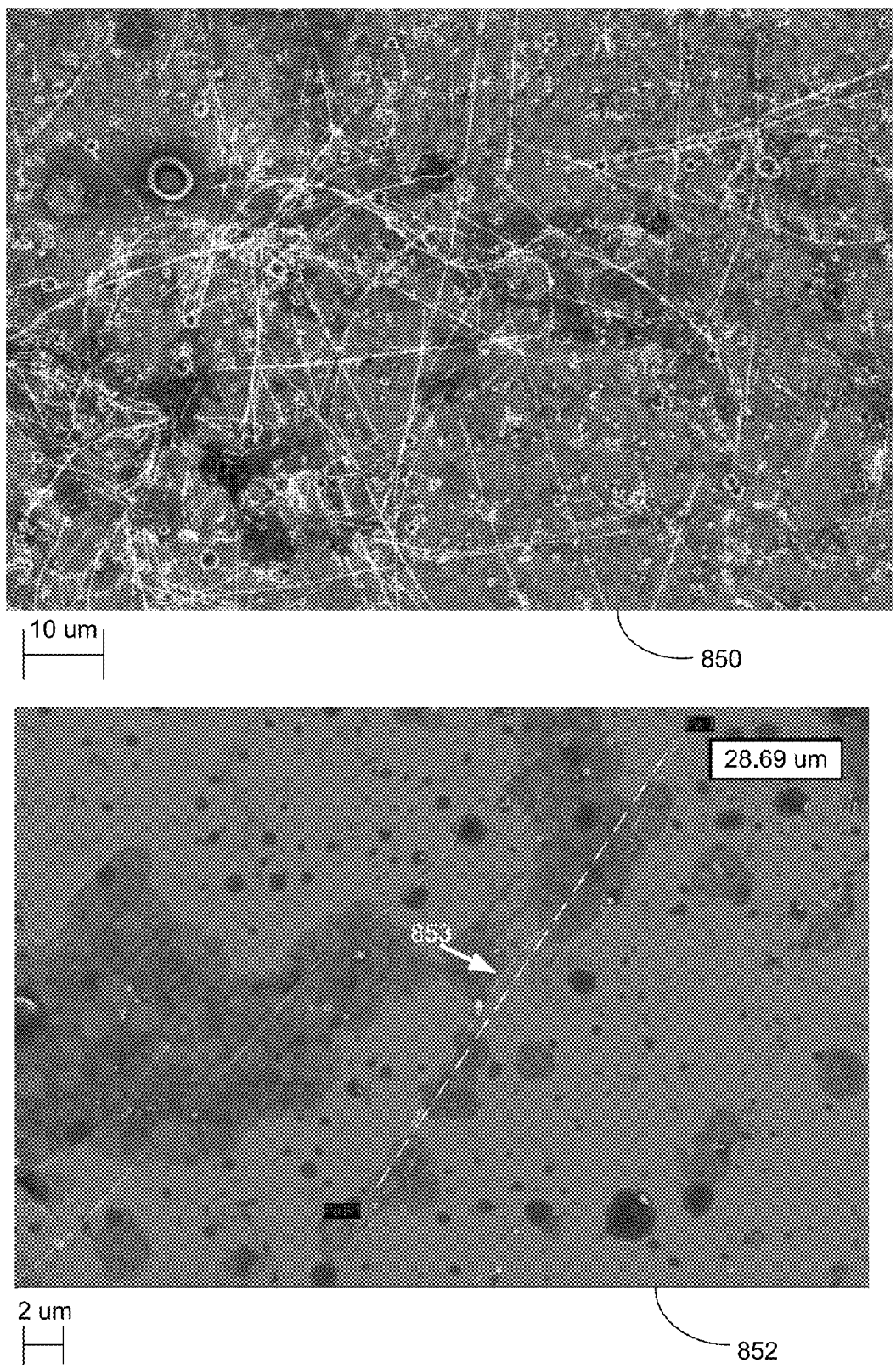
FIG. 8 shows SEM images of a sample of copper nanowires formed from solution.

Copper nanowires were formed from a solution of 21 mg $CuCL_2.H_2O$, 180 mg HDA and 50 mg glucose. The reaction was run at 95° C. for 8 hours. Samples were then taken and dried overnight. FIG. 8 shows SEM images 850 and 852 of a sample at different magnifications. Image 852 shows a very long and flexible copper nanowire. The nanowire 853 was measured at almost 30 microns long, with longer nanowires observed.

Example 2

Figure 9:
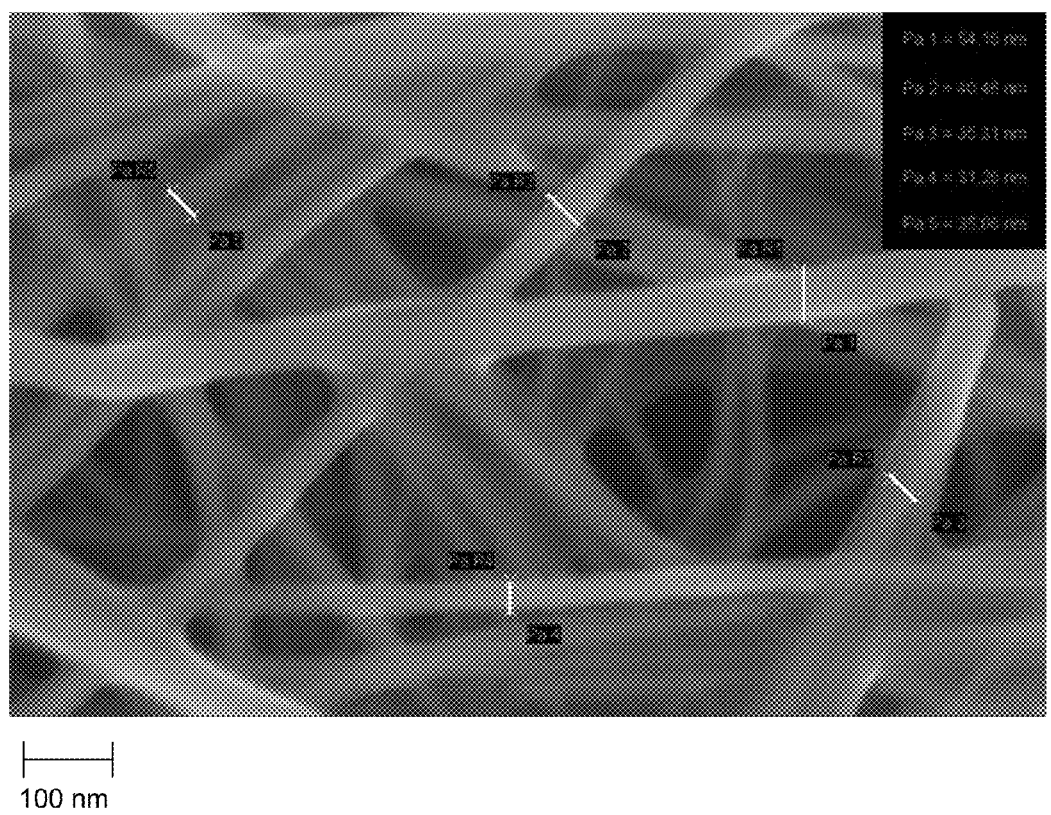
FIG. 9 shows an SEM image of a sample of copper nanowires formed from solution.

Copper nanowires were formed as in Example 1 with 270 g HDA (HDA:Cu ratio of 9:1). FIG. 9 shows an SEM image of a sample of a network of nanowires. Diameters of five nanowires were measured, ranging from 31.26 nm to 54.16 nm, with an average value of 39+/-9 nm.

Example 3

Copper nanowires were formed as in Example 1 with silicon nanoparticle powder added to the solution in a 1:1 Cu:Si molar ratio. Energy-dispersive X-ray spectroscopy (EDS) analysis on two samples gave the following atomic percentages.

|  | Si % | Cu % |
| --- | --- | --- |
| Sample 1 | 34 | 66 |
| Sample 2 | 45 | 55 |

Copper was found present in nanowire and nanocrystal forms. Without being bound by a particular theory, it is believed that the large surface area may accelerate copper nucleation and that the amine adsorption on the silicon surface may affect the capping efficiency of the copper crystals.

Example 4

Figure 10:
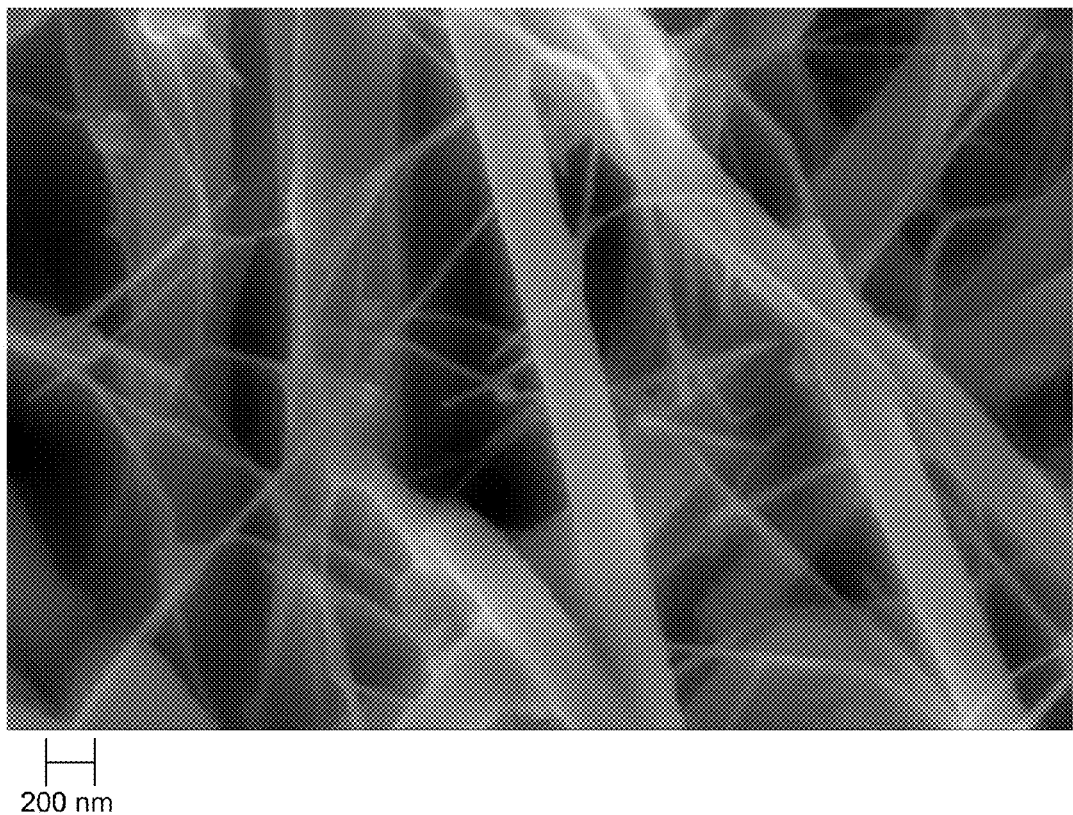
FIG. 10 shows an SEM image of a silicon-embedded copper nanostructure network.

Silicon nanowires and copper nanowires were mixed in IPA and drop cast on copper foil, and annealed for 250° C. at 30 minutes. No metal silicide formation was observed. The silicon nanowires and copper nanowires readily mix together to form a silicon-embedded copper nanostructure network. FIG. 10 is an SEM image showing of a portion of the network, including larger silicon nanowires and much thinner copper nanowires. The copper nanowires are long and tangled around the silicon nanowires, forming a conductive network interconnecting the silicon nanowires. The Cu:Si mass ratio was 1.5:1.

Figure 11:
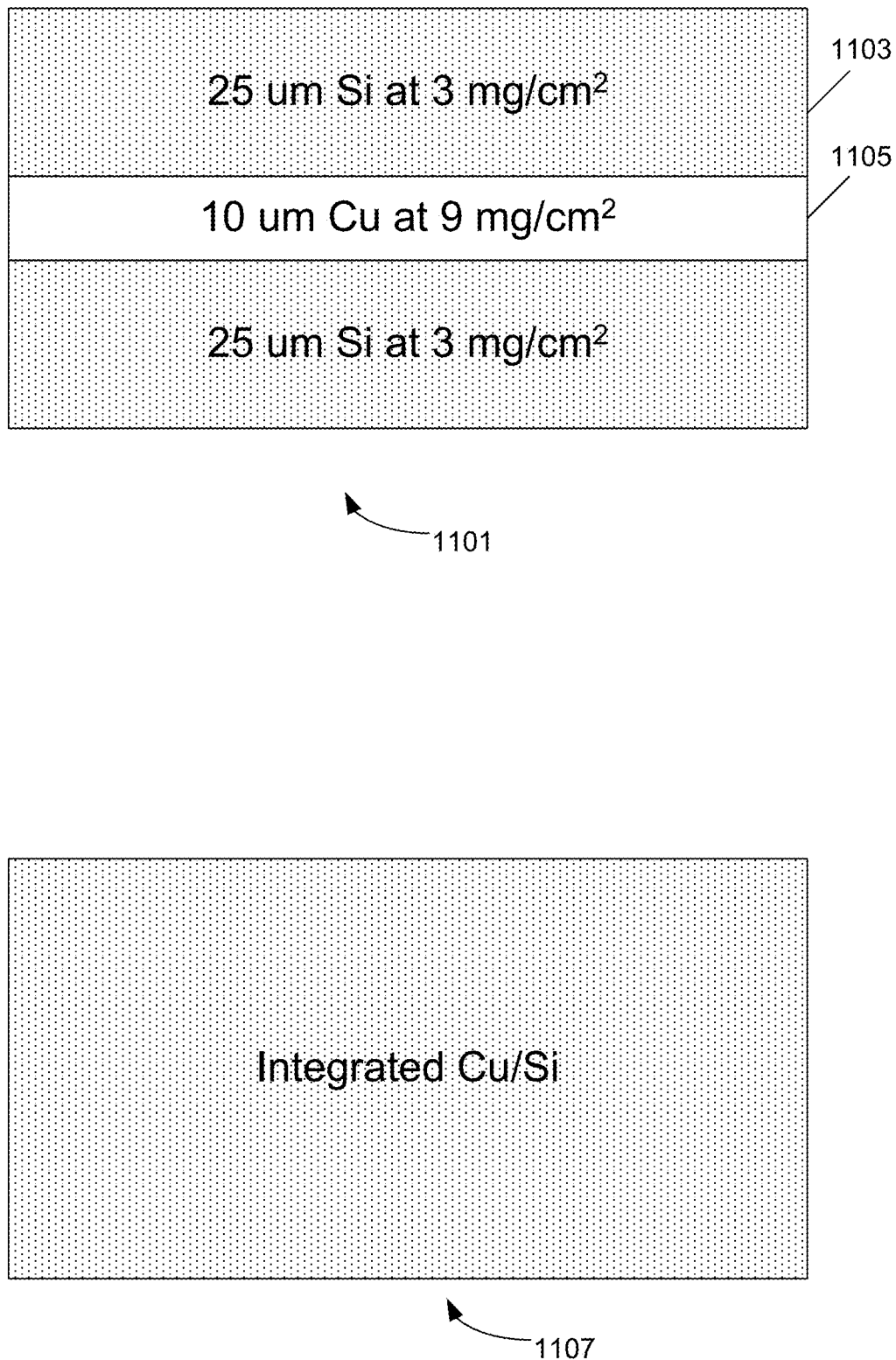
FIG. 11 shows examples of anode architectures according to various implementations.

FIG. 11 shows examples of anode architectures according to various implementations. A schematic representation of an example of an anode 1101 having an active layer 1103 including silicon on a thin copper foil 1105 is shown. In some implementations, the active layer may include silicon-embedded copper nanostructure networks as described above. An anode 1107 with integrated Cu/Si active layer and no separate conductive substrate only is shown. The active layers shown in 1103 and 1105 may be binder-free in certain implementations. The active layer of anode 1107 has high integrated electrical conductivity without need for a conductive substrate. This increases the energy density of the anode.

Figure 12:
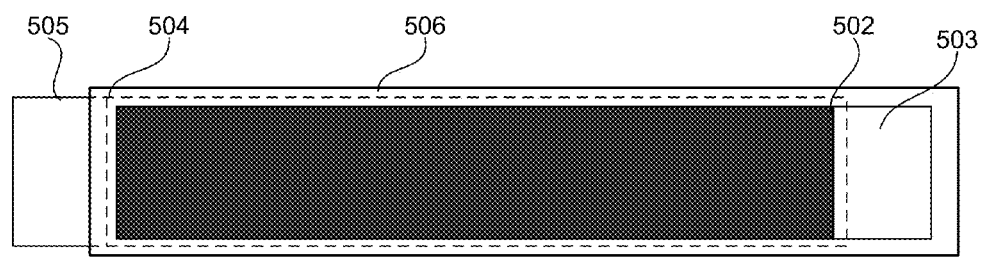
FIG. 12 is schematic representation of a plan view of a partially-assembled electrochemical cell that uses electrodes described herein, according to certain implementations.

FIG. 12 is a plan view of a partially-assembled electrochemical cell that uses electrodes described herein, according to certain implementations. The cell has a positive electrode active layer 502 that is show covering a major portion of a positive current collector 503. The cell also has a negative electrode active layer 504 that is show covering a major portion of a negative current collector 505. Between the positive electrode active layer 502 and the negative electrode active layer 504 is a separator 506. As indicated above, in some implementations, the cell does not include a negative current collector 505.

In some implementations, the negative electrode active layer 504 is slightly larger than the positive electrode active layer 502 to ensure trapping of the lithium ions released from the positive electrode active layer 502 by the active material of the negative active layer 504. In one implementation, the negative active layer 504 extends at least between about 0.25 and 5 mm beyond the positive active layer 502 in one or more directions. In a more specific implementation, the negative layer extends beyond the positive layer by between about 1 and 2 mm in one or more directions. In certain implementations, the edges of the separator 506 extend beyond the outer edges of at least the negative active layer 504 to provide complete electronic insulation of the negative electrode from the other battery components.

Figure 13:
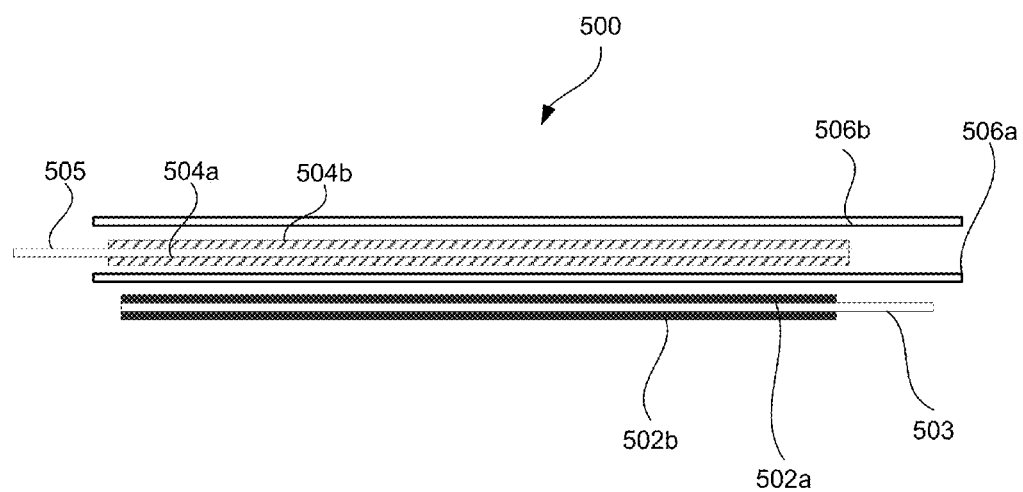
FIG. 13 is schematic representation of a cross-sectional view of an electrode stack of a partially-assembled electrochemical cell that uses electrodes described herein, according to certain implementations.

FIG. 13 is a cross-section view of an electrode stack 500 of the partially-assembled electrochemical cell that uses electrodes described herein, according to certain implementations. There is a positive current collector 503 that has a positive electrode active layer 502a on one side and a positive electrode active layer 502b on the opposite side. There is a negative current collector 505 that has a negative electrode active layer 504a on one side and a negative electrode active layer 504b on the opposite side. There is a separator 506a between the positive electrode active layer 502a and the negative electrode active layer 504a. The separator 506 serves to maintain mechanical separation between the positive electrode active layer 502a and the negative electrode active layer 504a and acts as a sponge to soak up liquid electrolyte (not shown) that will be added later. The ends of the current collectors 503, 505 on which there is no active material can be used for connecting to the appropriate terminal of a cell (not shown). As indicated above, in some implementations, the cell does not include a negative current collector 505.

The electrode layers 502a, 504a, the current collectors 503, 505 (if present) and the separator 506a together can be said to form one electrochemical cell unit. The complete stack 500 shown in FIG. 13, includes the electrode layers 502b, 504b and the additional separator 506b. The current collectors 503, 505 can be shared between adjacent cells. When such stacks are repeated, the result is a cell or battery with larger capacity than that of a single cell unit.

Figure 14A:
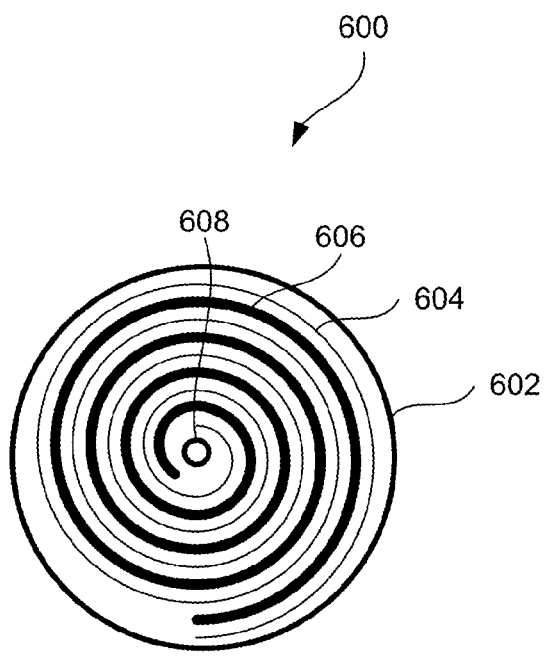
FIGS. 14A, 14B and 15 are schematic representations of various views of electrodes wound together with two sheets of separator to form a cell, according to certain implementations.
Figure 14B:
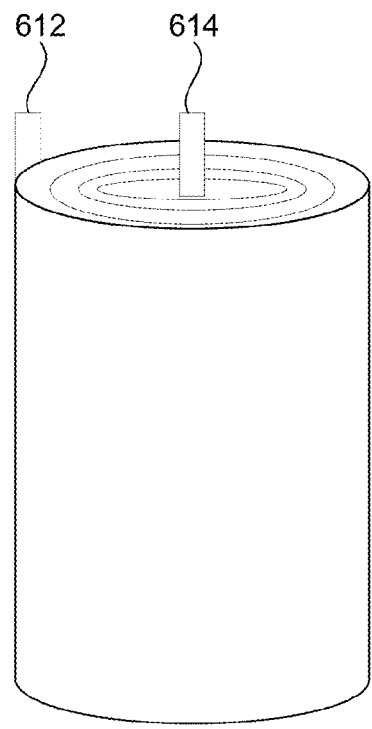

In some implementations, a large cell unit is wound upon itself to make multiple stacks. The cross-section schematic illustration in FIG. 14A shows how long and narrow electrodes can be wound together with two sheets of separator to form a battery or cell, sometimes referred to as a jellyroll 600. The jellyroll is shaped and sized to fit the internal dimensions of a curved, often cylindrical, case 602. The jellyroll 600 has a positive electrode 606 and a negative electrode 604. The white spaces between the electrodes are the separator sheets. The jelly roll can be inserted into the case 602. In some implementations, the jellyroll 600 may have a mandrel 608 in the center that establishes an initial winding diameter and prevents the inner winds from occupying the center axial region. The mandrel 608 may be made of conductive material, and, in some implementations, it may be a part of a cell terminal. FIG. 14B shows a perspective view of the jelly roll 600 with a positive tab 612 and a negative tab 614 extending from the positive current collector (not shown) and the negative current collector (if present, not shown), respectively. The tabs may be welded to the current collectors. In implementations in which a current collector is not present, a tab may be attached to the conductive active layer.

The length and width of the electrodes depend on the overall dimensions of the cell and thicknesses of the active layers and the current collectors. For example, a conventional 18650 cell with 18 mm diameter and 65 mm length may have electrodes that are between about 300 and 1000 mm long. Shorter electrodes corresponding to lower rate/higher capacity applications are thicker and have fewer winds.

A cylindrical design may be used for some lithium ion cells especially when the electrodes can swell during cycling and thus exert pressure on the casing. It is useful to use a cylindrical casing that is as thin as possible while still able to maintain sufficient pressure on the cell (with a good safety margin). Prismatic (flat) cells may be similarly wound, but their case may be flexible so that they can bend along the longer sides to accommodate the internal pressure. Moreover, the pressure may not be the same within different parts of the cell, and the corners of the prismatic cell may be left empty. Empty pockets generally should be avoided within lithium ions cells because electrodes tend to be unevenly pushed into these pockets during electrode swelling. Moreover, the electrolyte may aggregate in empty pockets and leave dry areas between the electrodes, negatively affecting lithium ion transport between the electrodes. Nevertheless, for certain applications, such as those dictated by rectangular form factors, prismatic cells are appropriate. In some implementations, prismatic cells employ stacks of rectangular electrodes and separator sheets to avoid some of the difficulties encountered with wound prismatic cells.

Figure 15:
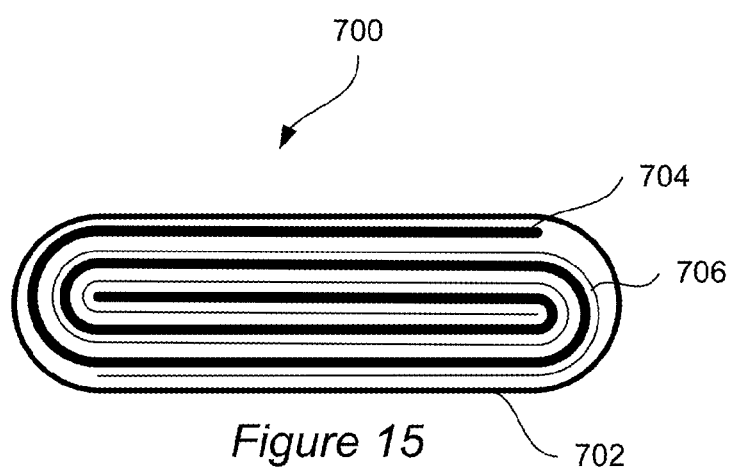

FIG. 15 illustrates a top view of a wound prismatic jellyroll 700. The jellyroll 700 includes a positive electrode 704 and a negative electrode 706. The white space between the electrodes is the separator sheet. The jelly roll 700 is enclosed in a rectangular prismatic case 702. Unlike cylindrical jellyrolls shown in FIGS. 14A and 14B, the winding of the prismatic jellyroll starts with a flat extended section in the middle of the jelly roll. In one implementation, the jelly roll may include a mandrel (not shown) in the middle of the jellyroll onto which the electrodes and separator are wound.

Figure 16A:
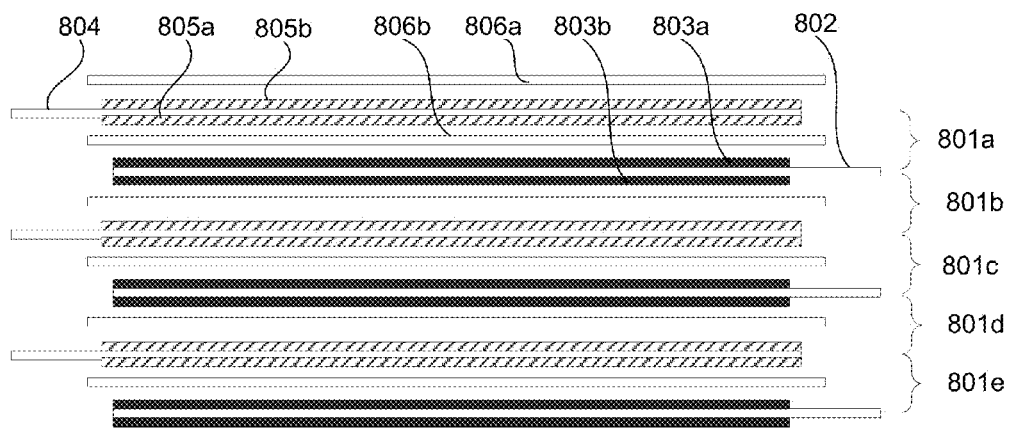
FIGS. 16A and 16B are schematic representations of cross-sectional and perspective views of a stacked cell that includes a plurality of cells, according to certain implementations.
Figure 16B:
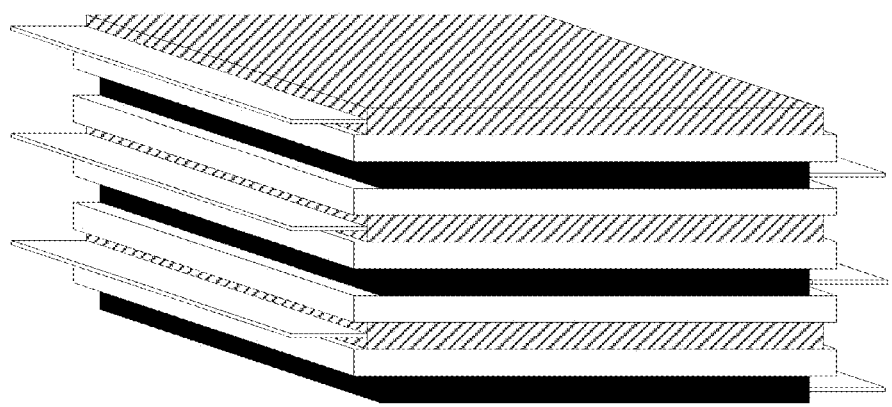

FIG. 16A illustrates a cross-section of a stacked cell that includes a plurality of cells (801a, 801b, 801c, 801d, and 801e), each having a positive electrode (e.g., 803a, 803b), a positive current collector (e.g., 802), a negative electrode (e.g., 805a, 805b), a negative current collector (e.g., 804), and a separator (e.g., 806a, 806b) between the electrodes. Each current collector is shared by adjacent cells. One advantage of stacking cells is that the stack can be made in almost any shape, which is particularly suitable for prismatic batteries. The current collector tabs typically extend from the stack and lead to a battery terminal. FIG. 16B shows a perspective view of a stacked cell that includes a plurality of cells.

Once the electrodes are arranged as described above, the battery is filled with electrolyte. The electrolyte in lithium ions cells may be liquid, solid, or gel. Lithium ion cells with the solid electrolyte are also referred to as a lithium polymer cells.

A typical liquid electrolyte includes one or more solvents and one or more salts, at least one of which includes lithium. During the first charge cycle (sometimes referred to as a formation cycle), the organic solvent in the electrolyte can partially decompose on the negative electrode surface to form a solid electrolyte interphase layer (SEI layer). The interphase is generally electrically insulating but ionically conductive, allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), and combinations thereof.

Non-aqueous liquid solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one implementation, a cyclic carbonate may be combined with a linear ester. Moreover, a cyclic carbonate may be combined with a lactone and a linear ester. In a specific implementation, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4$, $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. Common combinations include $LiPF_6$ and $LiBF_4$, $LiPF_6$ and $LiN(CF_3SO_2)_2$, $LiBF_4$ and $LiN(CF_3SO_2)_2$.

In one implementation the total concentration of salt in a liquid non-aqueous solvent (or combination of solvents) is at least about 0.3 M; in a more specific implementation, the salt concentration is at least about 0.7 M. The upper concentration limit may be driven by a solubility limit or may be no greater than about 2.5 M; in a more specific implementation, no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as Polyvinylidene fluoride (PVDF) or chloride or copolymer of their derivatives, Poly(chlorotrifluoroethylene), poly(ethylene-chlorotrifluoro-ethylene), or poly(fluorinated ethylene-propylene), Polyethylene oxide (PEO) and oxymethylene linked PEO, PEO-PPO-PEO crosslinked with trifunctional urethane, Poly(bis(methoxy-ethoxy-ethoxide))-phosphazene (MEEP), Triol-type PEO crosslinked with difunctional urethane, Poly((oligo)oxyethylene)methacrylate-co-alkali metal methacrylate, Polyacrylonitrile (PAN), Polymethylmethacrylate (PNMA), Polymethylacrylonitrile (PMAN), Polysiloxanes and their copolymers and derivatives, Acrylate-based polymer, other similar solvent-free polymers, combinations of the foregoing polymers either condensed or cross-linked to form a different polymer, and physical mixtures of any of the foregoing polymers. Other less conductive polymers may be used in combination with the above polymers to improve strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 17:
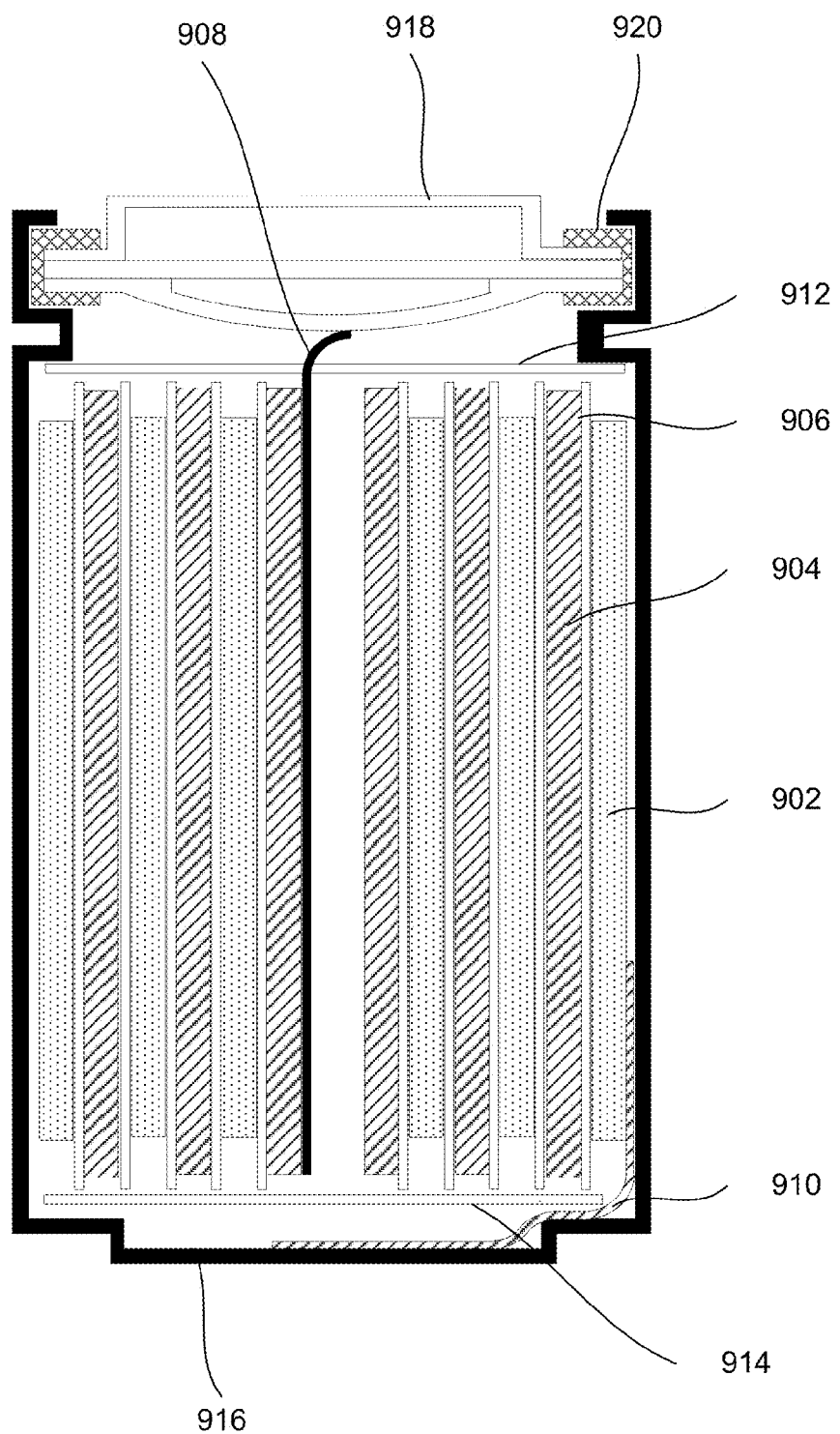
FIG. 17 is schematic representation of cross-sectional view of a wound cylindrical cell, in accordance with certain implementations.

FIG. 17 illustrates a cross-section view of the wound cylindrical cell in accordance with one implementation. A jelly roll includes a spirally wound positive electrode 902, a negative electrode 904, and two sheets of the separator 906. The jelly roll is inserted into a cell case 916, and a cap 918 and gasket 920 are used to seal the cell. In some cases, cap 918 or case 916 includes a safety device. For example, a safety vent or burst valve may be employed to break open if excessive pressure builds up in the battery. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative implementation, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may be used for internal insulation. During fabrication, the cap 918 may be crimped to the case 916 in order to seal the cell. However prior to this operation, electrolyte (not shown) is added to fill the porous spaces of the jelly roll.

A rigid case is typically used for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

A lithium ion battery, which may form or be part of a cell pack or a battery pack, includes one or more lithium ion electrochemical cells, each containing electrochemically active materials. In addition to the cells, a lithium ion battery may also include a power management circuit to control balance power among multiple cells, control charge and discharge parameters, ensure safety (thermal and electrical runaways), and other purposes. Individual cells may be connected in series and/or in parallel with each other to form a battery with appropriate voltage, power, and other characteristics.

In addition to the battery applications described above, the active-material embedded nanostructure conductive networks may be used in fuel cells, hetero-junction solar cell active materials, and other applications in which conductive electrochemically active materials having high capacity are desirable.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present implementations are to be considered as illustrative and not restrictive.

What is claimed is:

1. A structure comprising:
   a plurality of nanowires of a first type; and
   a plurality of nanowires of a second type;
   wherein at least a portion of the nanowires of the second type is growth rooted on at least some of the nanowires of the first type.

2. The structure of claim 1, wherein the nanowires of the first type comprise electrochemically active material.

3. The structure of claim 2, wherein the electrochemically active material is selected from the group consisting of silicon, silicon oxide(s), silicides, germanium, and tin.

4. The structure of claim 1, wherein the nanowires of the second type comprise electronically conductive material.

5. The structure of claim 4, wherein the electronically conductive material is selected from the group consisting of copper, silver, gold, palladium, nickel, and platinum or alloys thereof.

6. The structure of claim 1, wherein the structure has a porosity between about 20% and 80%.

7. An electrode for a lithium battery comprising:
   a substrate in electronic communication with a structure comprising:
   a plurality of nanostructures of a first type; and
   a plurality of nanostructures of a second type;
   wherein at least a portion of the nanostructure of the second type is growth rooted in at least some of the nanostructures of the first type and wherein the nanostructures of the second type comprise a plurality of metal nanowires.

8. A lithium battery comprising:
   a first electrode;
   a second electrode opposite in electrochemical function to the first electrode, wherein the second electrode is as described in claim 7; and
   an electrolyte in ionic communication with both the first electrode and the second electrode.

9. The structure of claim 3, wherein the nanowires of the second type comprise electronically conductive material.

10. The structure of claim 9, wherein the electronically conductive material is selected from the group consisting of copper, silver, gold, palladium, nickel, and platinum or alloys thereof.

11. An electrode structure comprising:
    a network of metal nanostructures including metal nanostructures in direct contact with other metal nanostructures in the network; and
    structures of high capacity active material embedded in the network of metal nanostructures, wherein the smallest dimension of the high capacity active material structures is at least an order of magnitude greater than that of the metal nanostructures.

12. The electrode structure of claim 11, further comprising a conductive surface coating at least around metal nanostructure-high capacity active material structure interfaces.

13. The electrode structure of claim 11, wherein the metal nanostructures are copper, silver, gold, palladium, nickel, and platinum or alloys thereof.

14. The electrode structure of claim 11, wherein electrode structure has a porosity between 20% and 80%.

15. The electrode structure of claim 11, wherein the electrode structure is not attached to a current collector substrate.

16. The electrode structure of claim 11, wherein the electrode structure is attached to a current collector substrate.

* * * * *